US006459516B1

(12) United States Patent
Mizrahi et al.

(10) Patent No.: US 6,459,516 B1
(45) Date of Patent: *Oct. 1, 2002

(54) DENSE WDM ADD/DROP MULTIPLEXER

(75) Inventors: Victor Mizrahi, Annapolis; Jean-Luc Archambault, Severna Park, both of MD (US)

(73) Assignee: Ciena Corporation, Linthicum, MD (US)

( * ) Notice: Subject to any disclaimer, the term of this patent is extended or adjusted under 35 U.S.C. 154(b) by 7 days.

This patent is subject to a terminal disclaimer.

(21) Appl. No.: 09/627,899

(22) Filed: Jul. 27, 2000

Related U.S. Application Data

(63) Continuation-in-part of application No. 08/927,781, filed on Sep. 11, 1997, now Pat. No. 6,281,997.

(51) Int. Cl.[7] .................................. H04J 14/02
(52) U.S. Cl. ...................... 359/127; 359/130; 359/129; 359/131
(58) Field of Search ............................. 359/127, 130, 359/129, 131

(56) References Cited

U.S. PATENT DOCUMENTS

| | | | | |
|---|---|---|---|---|
| 5,608,825 A | * | 3/1997 | Ip ................................ 385/24 |
| 5,748,350 A | * | 5/1998 | Pan et al. ..................... 359/130 |
| 5,751,454 A | * | 5/1998 | MacDonald et al. ........ 359/119 |
| 5,778,118 A | * | 7/1998 | Sridhar ......................... 385/24 |
| 5,959,749 A | | 9/1999 | Danagher et al. ............ 359/124 |
| 6,084,694 A | * | 7/2000 | Milton et al. ................ 359/124 |
| 6,151,145 A | * | 11/2000 | Srivastava et al. ........... 359/133 |
| 6,208,443 B1 | * | 3/2001 | Liu et al. ..................... 359/127 |
| 6,243,176 B1 | * | 6/2001 | Ishikawa et al. ............. 359/124 |
| 6,281,997 B1 | * | 8/2001 | Alexander et al. ........... 359/130 |

* cited by examiner

*Primary Examiner*—Leslie Pascal
*Assistant Examiner*—Hanh Phan
(74) *Attorney, Agent, or Firm*—David L. Soltz

(57) ABSTRACT

An optical add/drop multiplexer (OADM) is provided wherein input optical channels are supplied on first and second optical fibers, e.g. via an optical splitter. Low loss interference filters, for example, coupled to the first and second optical fibers, select respective groups or bands of channels. Selected groups of channels to be dropped by the OADM may be demultiplexed with sub-demultiplexers into individual channels. Groups of express channels are supplied to associated filters or gratings to ensure that the channel groups selected from the first and second optical fibers to do not contain undesired channels. Channels to be added by the OADM are multiplexed with sub-multiplexers into channel groups corresponding to the dropped channel groups. The added channel groups and the express channel groups are combined on a single output fiber.

26 Claims, 6 Drawing Sheets

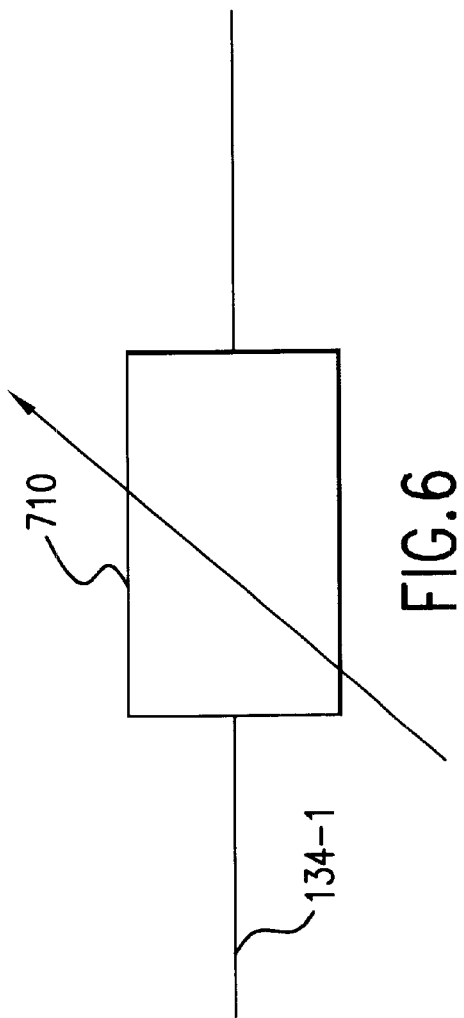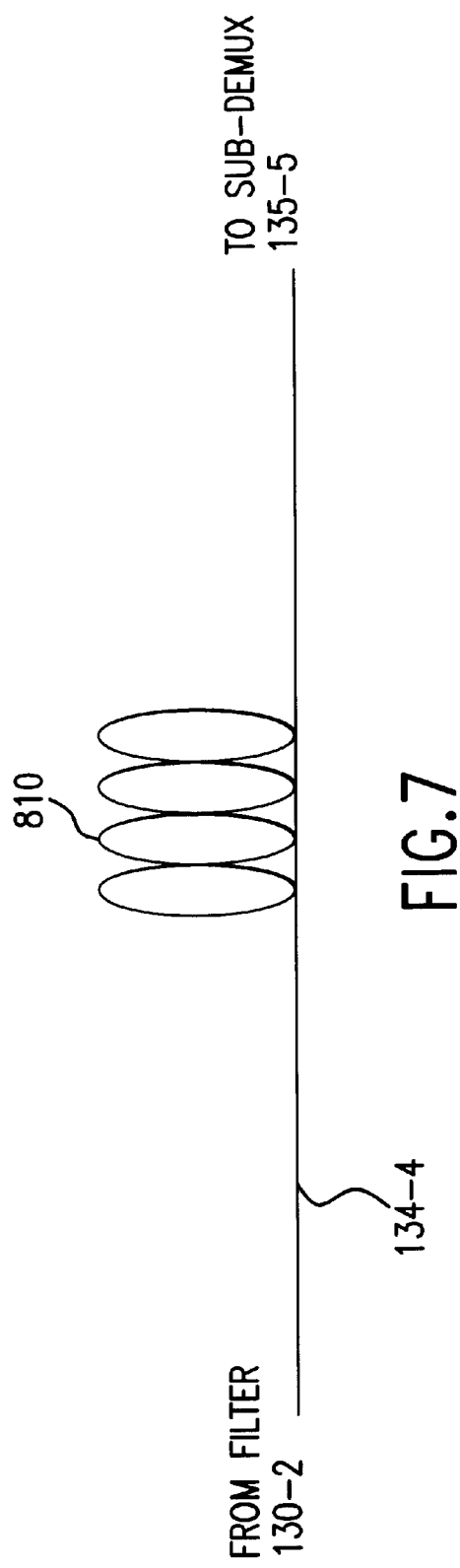

DENSE WDM ADD/DROP MULTIPLEXER

CROSS-REFERENCE TO RELATED APPLICATIONS

The present application is a continuation-in-part of pending U.S. application Ser. No. 08/927,781, filed on Sep. 11, 1997, now U.S. Pat. No. 6,281,997 the teachings of which are incorporated herein by reference.

FIELD OF THE INVENTION

The present invention is directed to an optical add/drop multiplexer for use in a dense wavelength division multiplexed optical system.

Optical communication systems are a substantial and fast growing constituent of communication networks. The expression "optical communication system," as used herein, relates to any system that uses optical signals to convey information across an optical waveguiding medium, for example, an optical fiber, and can also refer to transmission through free-space. Such optical systems include but are not limited to telecommunication systems, cable television systems, and local area networks (LANs). Currently, many optical communication systems are configured to carry an optical channel of a single wavelength over one or more optical waveguides. To convey information from plural sources, time-division multiplexing is frequently employed (TDM). In time-division multiplexing, a particular time slot is assigned to each signal source, the complete signal being constructed from the portions of the signals collected from each time slot. While this is a useful technique for carrying plural information sources on a single channel, its capacity is limited by fiber dispersion and the need to generate high peak power pulses.

While the need for communication services increases, the current capacity of existing waveguiding media is limited. Although capacity may be expanded e.g., by laying more fiber optic cables, the cost of such expansion is prohibitive. Consequently, there exists a need for a cost-effective way to increase the capacity of existing optical waveguides.

Wavelength division multiplexing (WDM) has been explored as an approach for increasing the capacity of existing fiber optic networks. WDM systems typically include a plurality of transmitters, each respectively transmitting signals on a designated one of a plurality of channels or wavelengths. In a simple point-to-point network, the channels are combined by a multiplexer at one end terminal and transmitted on a single fiber to a demultiplexer at another end terminal where they are separated and supplied to respective receivers. In more complex systems, an add/drop multiplexer may be present at each node for dropping one or more particular channels from the DWDM signal, and subsequently adding the one or more channels back to the signal prior to transmission to another network node.

In high channel count systems, the add/drop multiplexer can be relatively complex and expensive. In addition, many customers may initially deploy few channels, with the expectation that significantly more channels will be added later on. Accordingly, the add/drop multiplexer is preferably scalable to accommodate additional channels. Moreover, a residual amount of dropped channel power can pass through the add/drop multiplexer and interfere with the added channel light, thereby degrading system performance. Accordingly, there is a need for an add/drop multiplexer that can be arbitrarily configured to add and drop desired channels in a WDM system, and overcomes these problems.

SUMMARY OF THE INVENTION

Consistent with the present invention, an optical device is provided comprising an optical splitter having an input for coupling to an input optical path carrying a plurality of optical channels, each the optical channels having a respective wavelength. The splitter includes first and second outputs. The first output is coupled to a first output optical path, and the second output is coupled to a second output optical path. The first and second output optical paths carry the plurality of optical channels.

A first plurality of optical filtering elements is coupled to the first output optical path for respectively selecting first groups of the plurality of optical channels and associated undesired channels. A second plurality of optical filtering elements is coupled to the second output optical path for respectively selecting second groups of the plurality of optical channels and associated undesired channels. The first groups of optical channels are different than the second groups of optical channels.

At least one cleanup filter is coupled to an associated one of the first and second plurality of optical filtering elements for receiving one of the first and second groups of optical channels and the undesired channels associated with the received one of the first and second groups of optical channels. The cleanup filter supplies the associated one of the first and second groups of optical channels as an express channel group while reducing the undesired channels associated with the associated one of the first and second group of optical channels.

A multiplexer receives each of the express channel groups and at least one added channel group on associated inputs. Each of the added channel groups is different from each of the express channel groups. The multiplexer supplies an output comprising the express channel groups and the added channel groups in an aggregated form on a single optical output fiber.

A sub-demultiplexer may be coupled to an associated one of the first and second plurality of optical filtering elements. The sub-demultiplexer may have a plurality of outputs each presenting a respective drop channel associated with a corresponding one of the first and second groups of the plurality of channels. Also, a sub-multiplexer having a plurality of inputs each configured to receive a respective add channel associated with one of the add channel groups may be provided. The sub-multiplexer supplies an output to the multiplexer comprising one of the add channel groups.

BRIEF DESCRIPTION OF THE DRAWINGS

Advantages of the present invention will be apparent from the following detailed description of the presently preferred embodiments thereof, which description should be considered in conjunction with the accompanying drawings in which:

FIG. 6 illustrates a variable optical attenuator incorporated into an optical add/drop multiplexer consistent with the present invention;

FIG. 7 illustrates a dispersion compensating element incorporated into an optical add/drop multiplexer consistent with the present invention.

DETAILED DESCRIPTION

In an optical add/drop multiplexer (OADM) consistent with the present invention, input optical channels are provided on first and second optical fibers, e.g., via an optical splitter. Low loss interference filters, for example, coupled to the first and second optical fibers, select respective groups or bands of channels. Selected groups of channels to be dropped by the OADM may be demultiplexed with sub-demultiplexers into individual channels, each of which is then provided to an appropriate receiver. Groups of express channels, channels to be passed through the OADM, are supplied to associated filters, such as in-fiber Bragg gratings, to substantially eliminate undesired channels associated with the channel groups selected from the first and second optical fibers. Channels to be added by the OADM are multiplexed with sub-multiplexers into channel groups corresponding to the dropped channel groups. The added channel groups are coupled, along with the express channels, to, for example, respective ones of a plurality of cascaded interference filters for combining the groups of channels onto a single OADM output fiber.

Although the optical splitter introduces an optical power loss at the input to the demultiplexer, the interference filters, gratings, sub-demultiplexers, and sub-multiplexers create little additional loss. As a result, the total power loss associated with an OADM consistent with the present invention is significantly less than that obtained with a conventional n channel OADM based on a 1×n splitter and combiner. Accordingly, large numbers of channels, e.g., in excess of forty can be selectively added or dropped in a reliable and relatively inexpensive manner.

Figure 1:
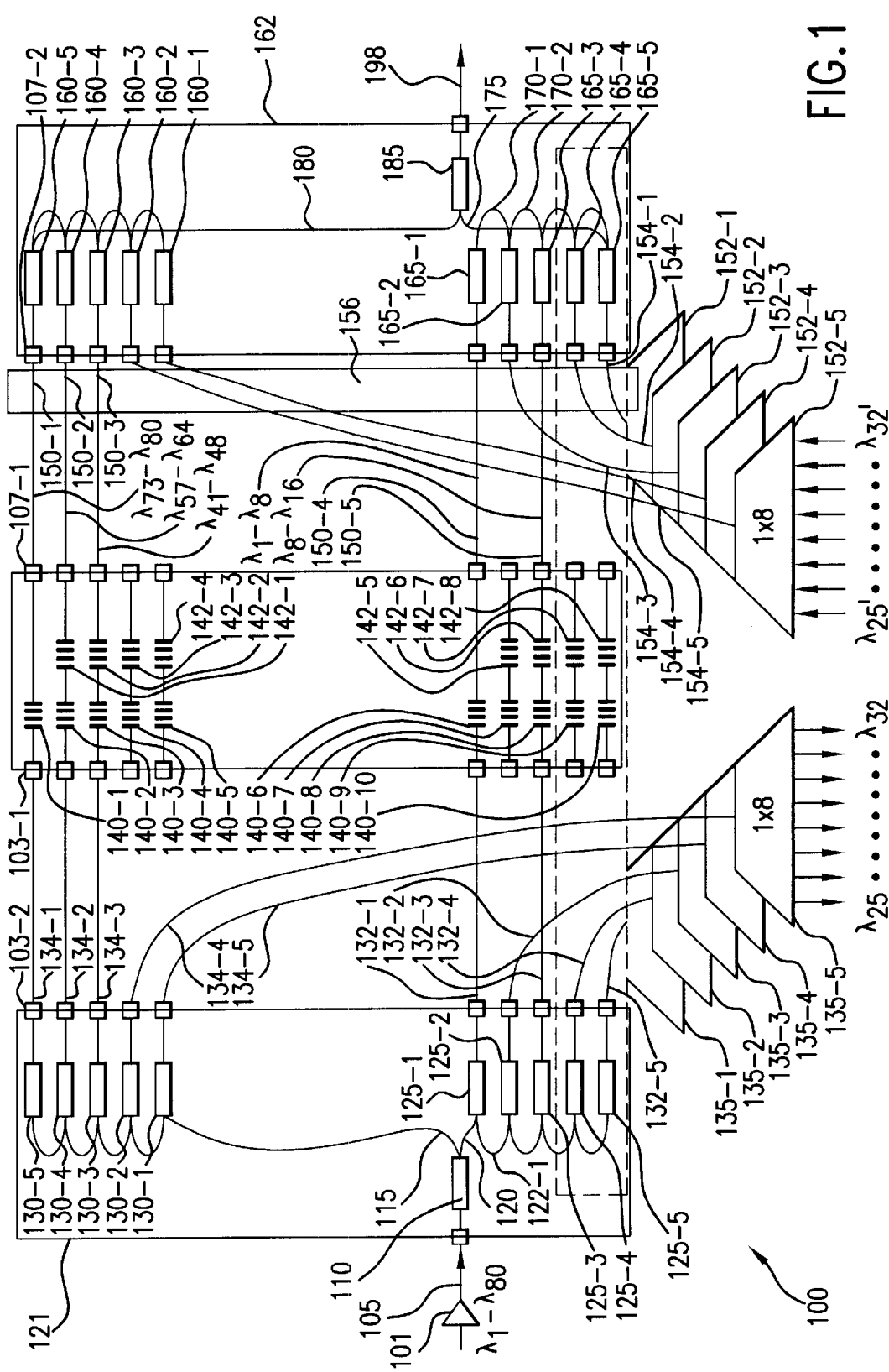
FIG. 1 illustrates a schematic diagram of an exemplary optical add/drop multiplexer consistent with the present invention.

Turning to the drawings in which like reference characters indicate the same or similar elements in each of the several views, FIG. 1 illustrates OADM 100 consistent with the present invention. As discussed in greater detail below, the exemplary OADM illustrated in FIG. 1 provides capability for adding/dropping any or all of 80 input channels. The present invention, however, is not limited to this number of channels. Rather, the present invention is applicable to OADMs that can separate any appropriate number of optical channels.

As further shown in FIG. 1, OADM 100 receives, for example, a plurality of multiplexed optical channels $\lambda_1-\lambda_{80}$ on input optical fiber 105. The multiplexed channels may be, for example, emitted by laser transmitters (not shown) coupled to optical fiber 105, which feeds optical demultiplexer 121, including optical splitter 110 and filtering elements 130, each of which comprising dielectric filters, for example. The multiplexed channels are supplied to the input of optical splitter 110, which supplies channels $\lambda_1-\lambda_{80}$ to first and second optical fibers 115 and 120, respectively. Optionally, optical amplifier 101 maybe provided at the input of coupler 110 in order to offset any loss introduced by splitter 110. Alternatively, the loss imposed by splitter 110 can be compensated by coupling optical amplifiers (not shown) to output fibers 115 and 120.

As further shown in FIG. 1, first optical filtering elements 125-1 to 125-5 are coupled to first output fiber 120, and second filtering elements 130-1 and 130-5 are coupled to second output fiber 115. Each of these filtering elements typically includes an interference filter commercially available from JDS Uniphase or DiCon, for example. It is to be understood, however, that a variety of filtering element configurations may be provided. For example, the filtering element may include a combination of an optical circulator and an in-fiber Bragg grating. Thus, the present invention is not limited to any specific filtering element configuration. Rather, it is understood that any optical component or combination of components capable of filtering groups of channels can be used.

Figure 2:
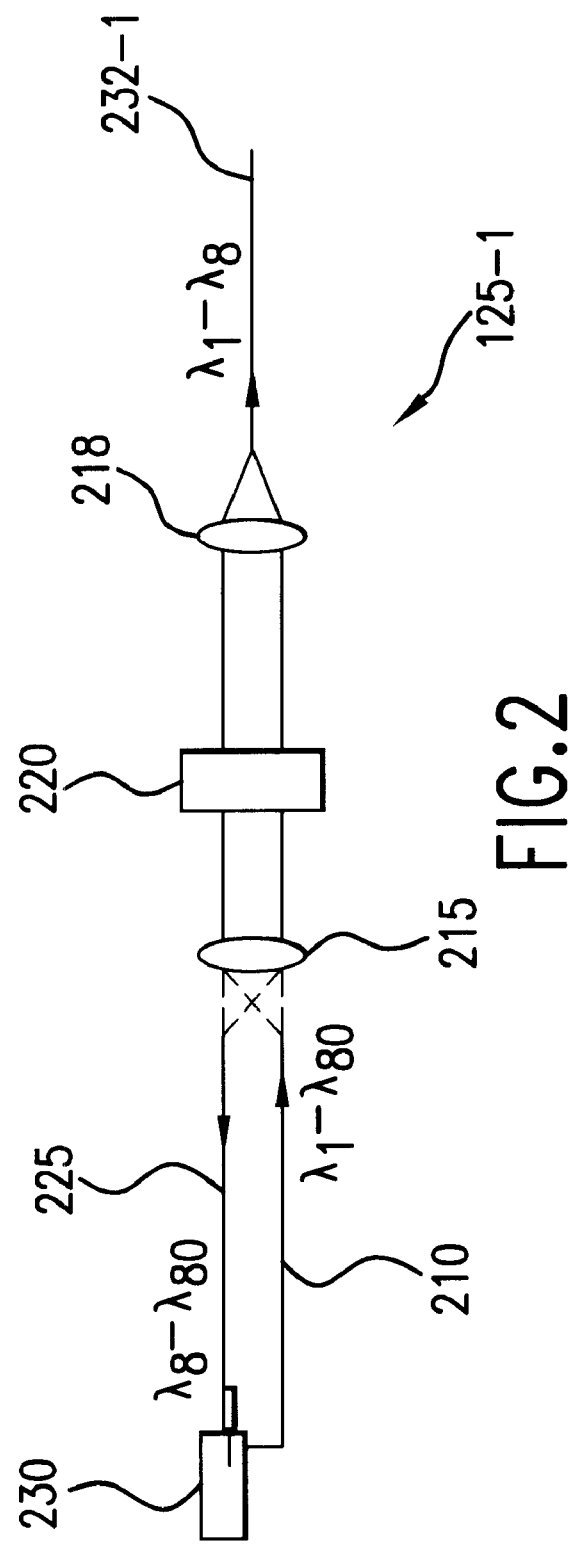
FIG. 2 illustrates a schematic diagram of an interference filter.

A simplified diagram of exemplary filtering element 125-1 incorporating an interference filter, for example, is illustrated in FIG. 2. Filtering element 125-1 receives channels $\lambda_1-\lambda_{80}$ on input fiber 210 having an end portion spaced from graded refractive index (GRIN) lens 215. As a result, light emitted from the end portion diverges prior to impinging on lens 215. Channels $\lambda_1-\lambda_{80}$ are collimated by lens 215 and directed toward dielectric thin film filter 220. Thin film filter 220 includes a substrate coated with a plurality of thin dielectric films of appropriate thickness and number to pass, in this case, channels $\lambda_1-\lambda_8$, and reflect channels $\lambda_9-\lambda_{80}$. Channels $\lambda_1-\lambda_8$ are thus transmitted to GRIN lens 218 where they are focused onto an end portion of output fiber 232-1. Channels $\lambda_9-\lambda_{80}$, however, are reflected back to GRIN lens 215, focused onto fiber 225 and output through port 230 to filtering element 125-2, which along with filtering elements 125-3, 125-4, and 125-5, typically has a similar construction as filtering element 125-1.

Figure 3:
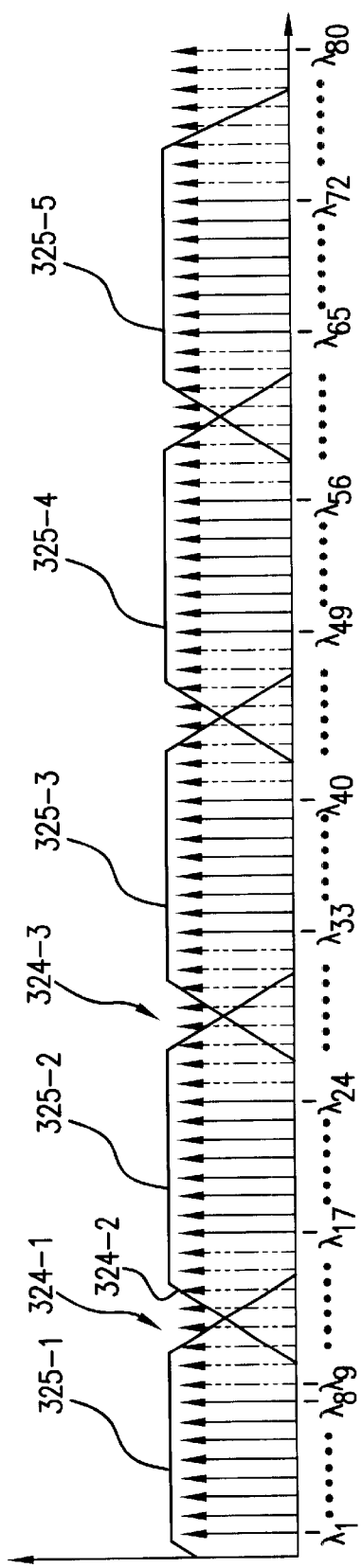
FIG. 3 illustrates transmittance characteristics of filtering elements 125-1 to 125-5 shown in FIG. 1.

The transmittance vs. wavelength characteristics of filtering elements 125-1 to 125-5 are shown in FIG. 3. Transmittance band 325-1 of filtering element 125-1 has a relatively high transmittance over a range of wavelengths including the first eight channels, $\lambda_1-\lambda_8$. As noted above, therefore, these channels are transmitted toward an output port of filtering element 125-1. It should be noted, however, that additional undesired channels, e.g. $\lambda_9-\lambda_{14}$, for example, are also at least partially transmitted, since they lie in the roll-off or shoulder on 324 of transmittance band 325-1.

Remaining channels $\lambda_{15}-\lambda_{80}$, as well as portions of some of the undesired channels in the roll off region 324, are reflected, e.g. on optical path 122-1, to filtering element 125-2 having high transmittance band 325-2. As a result, channels $\lambda_{17}-\lambda_{24}$ are transmitted toward the output port of filtering element 125-2. As further shown in FIG. 3, however, undesired channels $\lambda_{11}-\lambda_{16}$ and $\lambda_{25}-\lambda_{30}$, for example, adjacent $\lambda_{17}-\lambda_{24}$ may be at least partially transmitted since the lie in the roll-off regions 324-2 and 324-3 of filtering element 125-2.

Remaining channels $\lambda_{31}-\lambda_{80}$, along with portions of some of the channels in the roll off region 324-2, e.g., $\lambda_{27}-\lambda_{29}$ are reflected and output to filtering element 125-3 of which channels $\lambda_{33}-\lambda_{40}$ fall within high transmittance band 325-3 and are thus passed to an output port of filtering element 125-3. Undesired channels in the roll-off regions of filtering element 125-3, e.g., channels $\lambda_{27}-\lambda_{32}$ and $\lambda_{41}-\lambda_{46}$, however, are at least partially transmitted.

Channel group separation continues with reflected channels provided to filtering element 125-4 which transmits channels $\lambda_{49}-\lambda_{56}$ along with at least portions of the undesired channels in its roll off region, and reflects channels falling outside of its roll off region as well as portions of some channels within its roll off region. Filtering element 125-5 transmits channels $\lambda_{65}-\lambda_{72}$ along with at least portions of the undesired channels in its roll off region, and reflects channels falling outside of its roll off region as well as portions of some channels within its roll off region.

As noted above, channels lying outside the high transmittance bands of filtering elements 125-1, 125-2, 125-3, 125-4, and 125-5 are only partially reflected due to the relatively broad roll-off regions of the transmittance characteristics of interference filters. Accordingly, channels adjacent the intended channel sub-groups incur a significant amount of power loss and cannot be effectively detected. These channels are therefore supplied by filtering elements 130-1, 130-2, 130-3, 130-4, and 130-5 coupled to second output fiber 115, as discussed in greater detail below with reference to FIG. 4.

Figure 4:
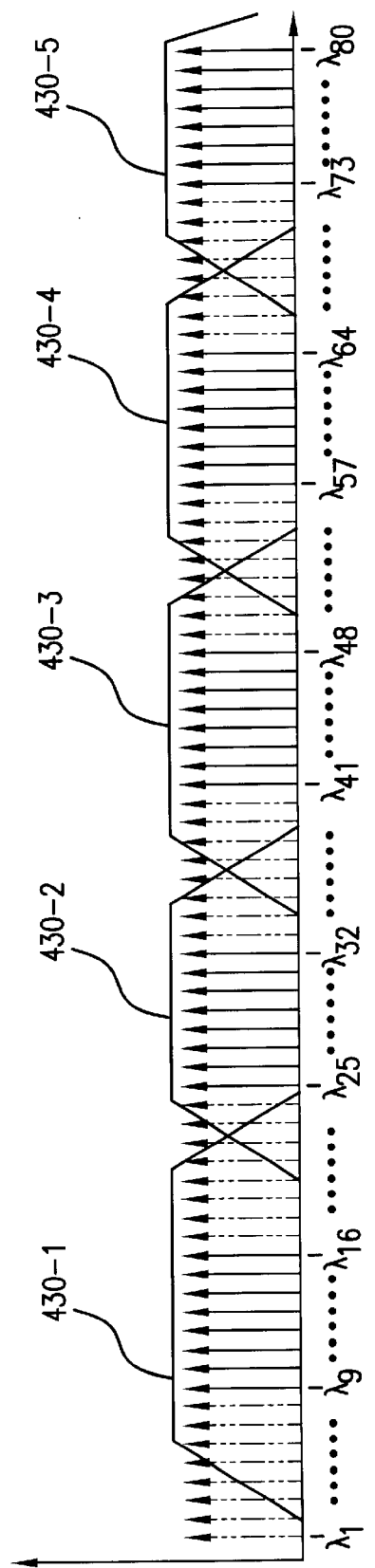
FIG. 4 illustrates transmittance characteristics of filtering elements 130-1 to 130-5 shown in FIG. 1.

As illustrated in FIG. 4, filtering element 130-1 has high transmittance band 430-1 extending over wavelengths $\lambda_9-\lambda_{16}$. Filtering element 130-1 typically has a similar construction to filtering element 125-1, and therefore transmits channels $\lambda_9-\lambda_{16}$ and at least portions of $\lambda_3-\lambda_8$ and $\lambda_{17}-\lambda_{22}$ which also lie in the transmittance band, either in the roll-off portions or in the high transmission band. Remaining channels $\lambda_{23}-\lambda_{80}$, along with at least portions of channels $\lambda_1-\lambda_5$ and $\lambda_{20}-\lambda_{22}$, which are in the roll-off regions of the transmittance band 430-1, are reflected to filtering element 130-2 having high transmittance band 430-2 encompassing channels $\lambda_{25}-\lambda_{32}$. Accordingly, channels $\lambda_{25}-\lambda_{32}$ are transmitted through filtering element 130-2, along with at least portions of the undesired channels in the roll-off regions.

Channel group separation continues with reflected channels provided to filtering element 130-3, 130-4, and 130-5 which transmit channels $\lambda_{41}-\lambda_{48}$, $\lambda_{57}-\lambda_{64}$, and $\lambda_{73}-\lambda_{80}$, respectively, along with at least portions of the undesired channels in their roll off regions in the manner described above. Filtering elements 130-3, 130-4, and 130-5 reflect channels falling outside of their roll off regions, as well as portions of some channels within their roll off regions.

Thus, in the illustrated embodiment the filtering elements separate an 80-channel input optical signal on fiber 105 into ten 8-channel groups, i.e., groups including $\lambda_1-\lambda_8$, $\lambda_9-\lambda_{16}$, $\lambda_{17}-\lambda_{24}$, $\lambda_{25}-\lambda_{32}$, $\lambda_{33}-\lambda_{40}$, $\lambda_{41}-\lambda_{48}$, $\lambda_{49}-\lambda_{56}$, $\lambda_{57}-\lambda_{64}$, $\lambda_{65}-\lambda_{72}$, and $\lambda_{73}-\lambda_{80}$. Alternating groups of channels are respectively transmitted by filtering elements 125-1 to 125-5 and 135-1 to 135-5. Elements 125-1 to 125-5 transmit channels $\lambda_1-\lambda_8$, $\lambda_{17}-\lambda_{24}$, $\lambda_{33}-\lambda_{40}$, $\lambda_{49}-\lambda_{56}$, and $\lambda_{65}-\lambda_{72}$, respectively, and elements 130-1 to 130-5 transmit channels $\lambda_9-\lambda_{16}$, $\lambda_{25}-\lambda_{32}$, $\lambda_{41}-\lambda_{48}$, $\lambda_{57}-\lambda_{64}$, and $\lambda_{73}-\lambda_{80}$, respectively.

As further shown in FIG. 1, selected ones of the channel groups may be dropped by the OADM by respectively directing them to sub-demultiplexers. For example, in the illustrated embodiment, channels $\lambda_{17}-\lambda_{24}$, $\lambda_{49}-\lambda_{56}$, $\lambda_{65}-\lambda_{72}$, $\lambda_9-\lambda_{16}$, and $\lambda_{25}-\lambda_{32}$ are directed on optical paths or fibers 132-2, 132-4, 132-5, 134-1, and 134-2, respectively, to sub-demultiplexers 135-3, 135-2, 135-1, 135-4, and 135-5, respectively, where further demultiplexing is performed to output individual channels on corresponding output ports. These output ports, in turn, may be coupled to respective ones of photodiodes (not shown) where the channels are converted into electrical signals for processing by appropriate circuitry (not shown).

The term sub-demultiplexer is used herein to describe an optical apparatus that demultiplexers the groups of channels respectively output from the filtering elements. A variety of sub-demultiplexers may be used in connection with an OADM consistent with the invention. For example, sub-demultiplexers 135-1 to 135-5 are discussed in greater detail below. Examples of sub-demultiplexers are discussed in detail in commonly owned U.S. application Ser. No. 08/927, 781, the teachings of which are incorporated herein by reference. The present invention is not, however, limited to any specific sub-demultiplexer configuration nor the specific number of inputs and outputs disclosed. Rather, it is understood that any optically demultiplexing component capable of demultiplexing a group of channels can be used.

Advantageously, filtering elements 125-1 to 125-5, 130-1 and 130-5 introduce little power loss to the selected sub-groups of channels. For example, the power loss associated with the channels reflected by the filtering elements is typically about 0.5 dB, and the loss associated with the channels transmitted through the filtering elements is about 0.7 dB. Thus, the overall loss of an OADM consistent with the present invention is significantly reduced.

It is noted that as the channels propagate down one of output fibers 115 or 120 in FIG. 1, the transmission loss through each filtering element can accumulate. However, since the loss associated with each filtering element is so low, channels can pass through four filtering elements cascaded from one of output fibers 115 and 120, and incur less than 3 dB of loss. Accordingly, additional channel groups can be demultiplexed with little additional loss simply by concatenating additional filtering elements with fiber patch cord, for example, between adjacent couplers. Alternatively, filtering elements can be easily added by coupling the output of one filtering element to one end of an optical fiber via a first fiber optic coupler and coupling the other end of the optical fiber to another filtering element via a second fiber optic coupler. Thus, the OADM in accordance with the present invention is readily expandable and upgradable to accommodate more channels with minimal expense and relatively little loss.

With reference again to FIG. 1, channel groups $\lambda_1-\lambda_8$, $\lambda_{33}-\lambda_{40}$, $\lambda_{41}-\lambda_{48}$, $\lambda_{57}-\lambda_{64}$ and $\lambda_{73}-\lambda_{80}$ are supplied on lines 132-1, 132-3, 134-3, 134-4, and 134-5, respectively, to be passed through or expressed through the OADM. Ultimately, in a manner to be described in more detail below, the OADM combines these express channel groups along with added groups corresponding to the dropped groups into an aggregate signal on an OADM output fiber 198. As noted above, however, channel groups transmitted by the filtering elements 125-1 to 125-5 and 130-1 to 130-5 include respective desired channels, as well as at least portions of undesired channels falling within the respective filter roll-off regions.

To prevent interference between the respective groups of channels when they are recombined into an aggregate signal, each group of express channels is supplied to one or more corresponding cleanup filters 140-1 to 140-10 and 142-1 to 142-8. In general, the clean up filters are configured to transmit the channels within a desired channel group and reject out of band channels, such as those in the roll-off regions of the filters. As shown in FIG. 1, for example, filtering element 125-3 transmits the express channel group $\lambda_{33}-\lambda_{40}$, along with at least portions of the channels falling within the roll off regions its transmittance band 325-3, e.g. channels $\lambda_{27}-\lambda_{32}$ and $\lambda_{41}-\lambda_{46}$. The channels transmitted from element 123-3 are coupled to a first cleanup filter 140-8 through optical path 132-3. The first cleanup filter 140-8 substantially reflects channels in the lower wavelength roll-off region, i.e. $\lambda_{27}-\lambda_{32}$, of the filter element 125-3, and transmits the channels in the desired express channel group, $\lambda_{33}-\lambda_{40}$, as well as the channels in the higher wavelength roll-off region, i.e., $\lambda_{41}-\lambda_{46}$, of filtering element 125-3, but blocks $\lambda_{27}-\lambda_{32}$.

The channels transmitted by first cleanup filter 140-8 are supplied to a second cleanup filter 142-6. The second cleanup filter 142-6 substantially reflects channels in the higher wavelength roll-off region, i.e. $\lambda_{41}$–$\lambda_{46}$, of the filter element 125-3, and transmits the channels in the desired express channel group, $\lambda_{33}$–$\lambda_{40}$. Thus, the first and second clean up filters, in combination, substantially prevent transmittance of, i.e., reject, the undesired channels in the roll-off regions of the transmittance characteristic 325-3 associated with filter element 125-3.

Figure 5:
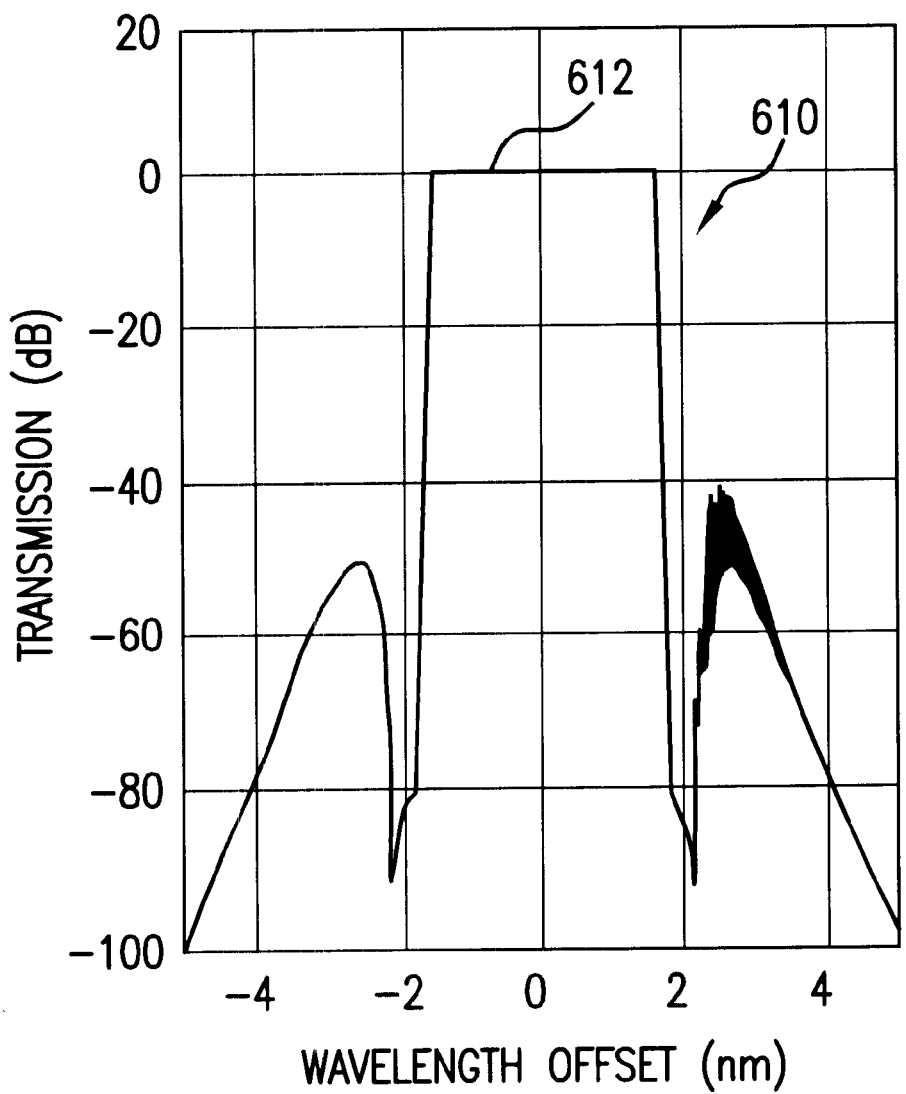
FIG. 5 illustrates an exemplary combined transmittance characteristic of a filtering element and associated cleanup filters consistent with the present invention.

In an exemplary 80-channel system with a 50 Ghz channel separation, the transmittance characteristic 610 of the combination of a respective one of the filtering elements 125-1 to 125-5 and 130-1 to 130-5 and first and second cleanup filters may be as illustrated in FIG. 5. As shown, the high transmittance band 612 of the characteristic 610 is centered on a desired group of express channels. Channels having a wavelength offset of ±2 nm are transmitted, while channels outside of the high transmittance band are substantially reflected.

In the exemplary embodiment illustrated in FIG. 1, the first and second cleanup filters are illustrated as in-fiber Bragg gratings configured to have a high transmittance band that coincides with the associated express channel groups. As illustrated, it is not typically necessary to include a combination of two cleanup filters associated with filter elements 125-1 and 130-5, which transmit channel groups including channels at the beginning and end of the aggregated signal, i.e. groups including $\lambda_1$–$\lambda_8$ and $\lambda_{72}$–$\lambda_{80}$, respectively Since there are no channels below $\lambda_1$ or greater than $\lambda_{80}$ the output of element 125-1 may be coupled to only a single cleanup filter 140-6 for filtering the channels in the high-wavelength roll-off region of the element 125-1, and the output of element 130-5 may be coupled to a single cleanup filter 140-1 for rejecting channels in the low-wavelength roll-off region of that element.

Although the cleanup filters in the illustrated exemplary embodiment are shown as in-fiber Bragg gratings, it is to be understood that present invention is not limited to any particular cleanup filter configuration. Those skilled in the art will recognize that a variety of filter configurations, e.g. interference filters, may be used to obtain the desired combined transmittance characteristic. Thus, it is understood that any optical filter component or combination of components can be used.

The express channel groups transmitted by the cleanup filters, i.e. groups $\lambda_1$–$\lambda_8$, $\lambda_{33}$–$\lambda_{40}$, $\lambda_{41}$–$\lambda_{48}$, $\lambda_{57}$–$\lambda_{64}$ and $\lambda_{73}$–$\lambda_{80}$ are supplied on fibers or lines 150-4, 150-5, 150-3, 150-2, and 150-1, respectively. Channels to be added by the OADM 100 may be combined by sub multiplexers 152-1 to 152-5 into respective channel groups corresponding to the dropped channel groups and supplied on lines 154-1 to 154-5. For example, added channels $\lambda_{25}$–$\lambda_{32}$ are supplied on respective input lines of sub-multiplexer 152-5, which combines these channels as an added channel group onto a single output line 154-5 to replace dropped channel group $\lambda_{25}$–$\lambda_{32}$ transmitted by filtering element 130-2.

Each sub-multiplexer 152-1 to 152-5 may have configuration similar to the sub-demultiplexers 135-1 to 135-5 with the inputs and outputs reversed. The present invention is not, however, limited to any specific sub-multiplexer configuration nor the specific number of inputs and outputs disclosed. Rather, it is understood that any optically multiplexing component capable of multiplexing a group of channels can be used.

In the illustrated embodiment, therefore, express channel groups $\lambda_1$–$\lambda_8$, $\lambda_{33}$–$\lambda_{40}$, $\lambda_{41}$–$\lambda_{48}$, $\lambda_{57}$–$\lambda_{64}$ and $\lambda_{73}$–$\lambda_{80}$ are supplied on lines 150-4, 150-5, 150-3, 150-2, and 150-1, respectively, and added channel groups $\lambda_{25}$–$\lambda_{32}$, $\lambda_9$–$\lambda_{16}$, $\lambda_{17}$–$\lambda_{24}$, $\lambda_{49}$–$\lambda_{56}$ and $\lambda_{65}$–$\lambda_{72}$ are supplied from sub-multiplexers 152-1 to 152-5 on lines 154-5, 154-4, 154-3, 154-2, and 154-1, respectively. The express and added channel groups may be coupled to respective inputs of an optional band equalizer 156 for substantially equalizing the optical signal power level of each channel group to ensure detection of each group in an aggregated signal. The band equalizer may contain an optical attenuator associated with each channel for establishing an attenuation level specific to each channel, as described, for example, in U.S. application Ser. No. 09/274,063, incorporated by reference herein. Other band equalizer configurations are possible. The present invention is not, therefore, limited to any particular band equalizer configuration.

As shown in FIG. 1, respective outputs of the band equalizer associated with each channel grouping are supplied to associated inputs of a multiplexer 162. The multiplexer 162 may be provided in a variety of configurations, as will be recognized by those skilled in the art. In the illustrated embodiment, however, each channel grouping is supplied to an associated one of a plurality of filtering elements 160-1 to 160-5 and 165-1 to 165-5. The filtering elements, commercially available from JDS Uniphase or E-Tek, for example, may be similar to filtering elements 125-1 to 125-5 and 130-1 to 130-5 with inputs and outputs reversed. For example, filtering element 165-1 transmits channel group $\lambda_1$–$\lambda_8$ on line 170-1 to an input of element 165-2. Element 165-2 reflects channel group $\lambda_1$–$\lambda_8$ on line 170-2 and transmits added channel group $\lambda_{17}$–$\lambda_{24}$ supplied on line 154-3 to line 170-2. Channel groups $\lambda_1$–$\lambda_8$ and $\lambda_{17}$–$\lambda_{24}$ are thus combined on line 170-2. Elements 163-3 to 165-4 add successive channel groups to an output path until channel groups $\lambda_{1-8}$, $\lambda_{17}$–$\lambda_{24}$, $\lambda_{33}$–$\lambda_{40}$, $\lambda_{49}$–$\lambda_{56}$ and $\lambda_{65}$–$\lambda_{72}$ are combined on line 175. Filtering elements 160-1 to 160-5 function in a similar manner to combine channel groups $\lambda_9$–$\lambda_{16}$, $\lambda_{25}$–$\lambda_{32}$, $\lambda_{41}$–$\lambda_{48}$, $\lambda_{57}$–$\lambda_{64}$ and $\lambda_{73}$–$\lambda_{80}$ onto line 180. Lines 175 and 180 are connected to coupler 185, similar in construction to splitter 110 but having the inputs and outputs reversed, which combines channel groups $\lambda_1$–$\lambda_8$, $\lambda_9$–$\lambda_{16}$, $\lambda_{17}$–$\lambda_{24}$, $\lambda_{25}$–$\lambda_{32}$, $\lambda_{33}$–$\lambda_{40}$, $\lambda_{41}$–$\lambda_{48}$, $\lambda_{49}$–$\lambda_{56}$, $\lambda_{57}$–$\lambda_{64}$, $\lambda_{65}$–$\lambda_{72}$ and $\lambda_{73}$–$\lambda_{80}$ onto OADM output line 198. Advantageously, the illustrated combiner is readily expandable by adding additional filtering elements. For example, additional channel groups can be multiplexed with little additional loss simply by concatenating additional filtering elements with fiber patch cord, for example, between adjacent couplers. In addition, pluralities of conventional optical connectors 103-1 and 103-2 facilitate relatively easy connection of fibers between gratings 140 and filtering elements 125. Moreover, connectors 107-1 and 107-2 facilitate connections between gratings 140 and filter elements 160. Accordingly, should OADM 100 be reconfigured to drop channels output from filtering element 130-5, for example, fiber 134-1 can be easily disconnected from connector 103-1 and coupled a sub-demultiplexer. Similarly, if channels output from filtering element 130-2 are to be passed through OADM 100, fiber 134-4 can be connected to an appropriate one of connectors 103-1 to thereby connect to gratings 140-4 and 142-3. In addition, one or more fibers can be provided to couple one of connectors 107-1 connected to grating 142-3 to a connector coupled to filtering element 160-2 via band equalizer 156.

There is thus provided an OADM configuration that minimizes power loss and enables adequate detection of the transmitted channels. In addition, the OADM of the present invention enables adding/dropping of all input optical channels, and can be readily expanded to accommodate additional channels with minimal expense. While the foregoing invention has been described in terms of the embodiments discussed above, numerous variations are possible. Several exemplary modifications will now be described with reference to FIGS. 7–9.

In regard to FIG. 6, optical signals output from optical amplifier 101 can have a "tilt", in which the optical intensity/power associated with each channel varies, often substantially linearly, with wavelength. Accordingly, optical signals propagating through OADM 100 can have spectrally non-uniform powers resulting in selected channels having more power than others. After these channels propagate through a chain of additional amplifiers located downstream from OADM 100, the low power channel can suffer from excessive noise-accumulation have an unacceptably low signal-to-noise ratio.

Accordingly, a variable optical attenuator (VOA) can be provided at the output of each of pass-through output of filters, such as filters 130-3 to 130-5, 125-1 and 125-3, and at the inputs of to filters 160-1, 160-1, and 165-2, 165-4 and 165-5, if necessary, to attenuate the optical channels supplied to these filters to result in substantially uniform output powers in optical amplifiers downstream from OADM 100. By way of example, FIG. 6 illustrates VOA 710 coupled to fiber 134-1 in FIG. 1 to substantially offset any tilt present in channels $\lambda_{73-80}$, and equalize the power of these channels. It is understood, however, that additional VOAs can be similarly coupled to other lines in OADM 100 shown in FIG. 1, as required, and/or as described above. For example, the VOA 710 could be coupled to fiber 150-1 instead of fiber 134-1.

Further, in connection with FIG. 7, optical signals transmitted in a fiber optic communication system typically constitute a series of pulses of digital information. Although the pulses are usually at a single nominal wavelength, each pulse is actually composed different spectral components. These spectral components propagate through the transmission fiber at different speeds with higher frequency components traveling slower than lower frequency components. This effect, known as "chromatic dispersion", can result in spectral components of one pulse arriving at a receiver at substantially the same time as a succeeding pulse, thereby causing degraded receiver sensitivity.

Unique fibers have been developed to offset or compensate chromatic dispersion. These fibers, referred to as dispersion compensated fiber or DCF, are commercially available from Corning Inc. and Lucent Technologies, for example. DCF fibers are typically specified with a dispersion coefficient having an opposite sign to that of the transmission fiber. The net dispersion experienced by the transmitted optical signal is thus the sum of the dispersion accumulated through the transmission fiber and the DCF. If the product of dispersion coefficient times length in the DCF is equal in magnitude and opposite in sign to that of the transmission fiber, the net dispersion is zero, and the dispersion is said to be compensated.

FIG. 7 illustrates an exemplary configuration whereby DCF 810 is coupled along line 134-4 in FIG. 1 to provide dispersion compensation for channels $\lambda_{25-32}$. Typically, DCF 810 will be configured to compensate for these wavelengths. Other segments of DCF, however, can be coupled to other lines, such as lines 134-5, 132-2 to 135-5 to provide dispersion compensation for the channel bands propagating therethrough. Typically, dispersion is wavelength-dependent, i.e., the dispersion has a "slope'. Accordingly, each DCF is advantageously selected to provide slope compensation for the channels supplied thereto. Since OADM 100 is modular, and connections can readily be made to pass or drop/add channels, desired dispersion compensating fibers can be relatively easily connected to provide the necessary compensation.

Figure 8:
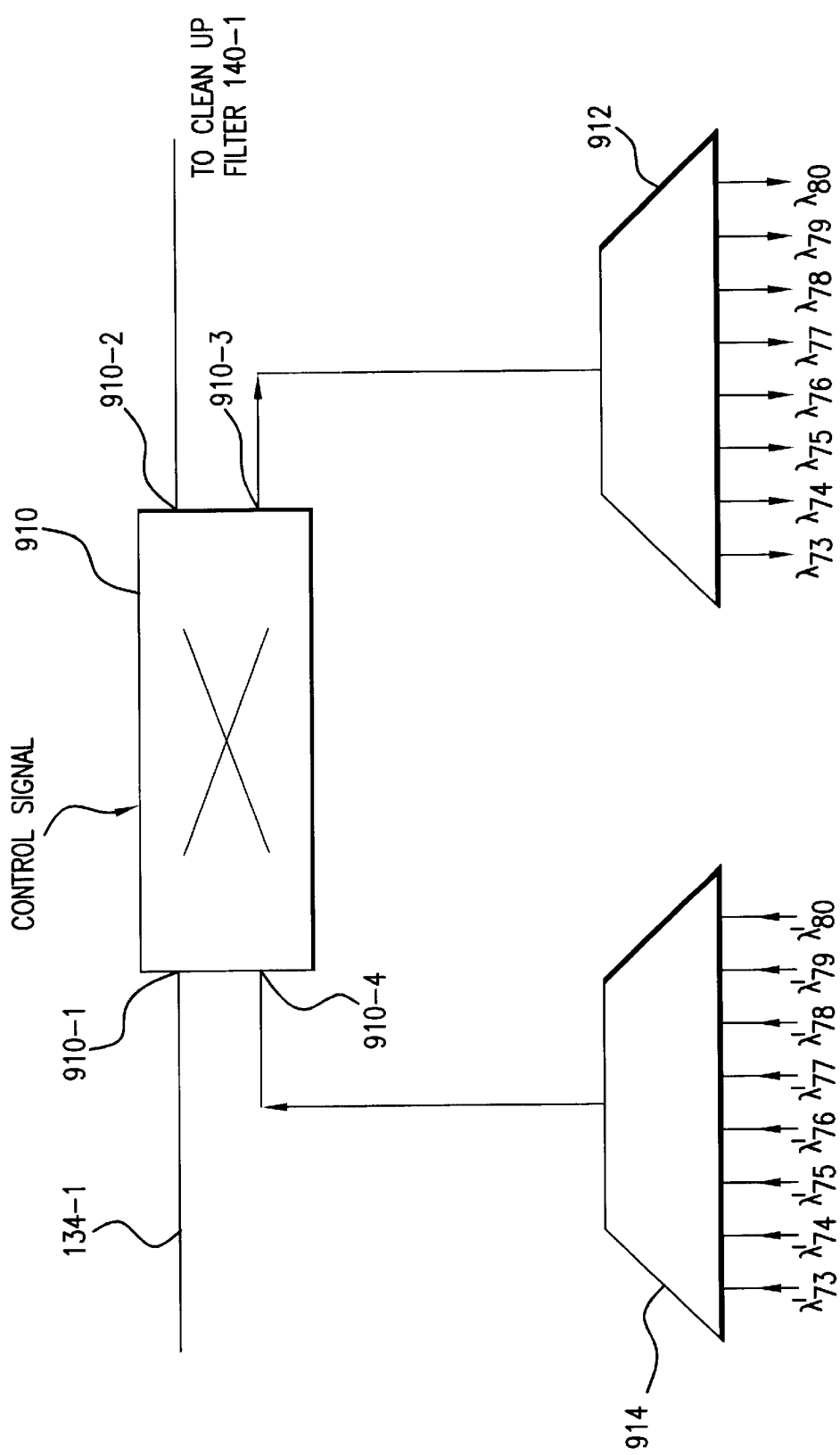
FIG. 8 illustrates an alternative embodiment of the present invention including a 2×2 optical switch.

Consistent with a further embodiment of the present invention, connectors 103 and 107 are eliminated and replaced by a plurality of 2×2 switches. One such switch, switch 910, is illustrated in FIG. 8. It is understood that other switches can be similarly configured to selectively add/drop or pass channel bands supplied to OADM 100.

As further shown in FIG. 8, switch 910 has a first input port 910-1 receiving a channel band including channels $\lambda_{72-80}$. In response to control signal, switch 910 can pass these channels through output port 910-2 and to clean up filter 140-1. Alternatively, in accordance with the control signal, channel $\lambda_{73-80}$ can be supplied to sub-demultiplexer 912 through second output port 910-3 and thus dropped, while added channels $\lambda'_{73-80}$ can be combined by sub-multiplexer 914 and supplied through second input port 910-4 and through output port 910-2 to clean-up filter 140-1. The signals are then combined by multiplexer 162 and combined onto output on line 198.

As noted above, the OADM consistent with the present invention add/drops or passes bands of channels. Accordingly, the cost of the OADM scales with numbers of bands, not individual channels. Thus, the cost of the OADM can be less than that of conventional OADMs. Moreover, the OADM can be reconfigured by attaching or removing sub-demultiplexer and multiplexer as noted above, which affects only selected channel bands. The remaining channel bands are thus unaffected while the OADM is reconfigured. Traffic can thus pass through the OADM uninterrupted. Further, as noted above, channel filters in the "roll-off" region of dielectric filters can still be added and dropped with the OADM consistent with the present invention. Thus, bandwidth-consuming guard bands are not required, and more capacity can be realized than in conventional approaches. Further, since channels ore grouped into bands, tailed dispersion slope compensation, as well as gain, i.e., power, equalization can be realized on a band-by-band basis.

Other modifications and changes such as those suggested above, but not limited thereto, are considered to be within the scope of the following claims.

What is claimed is:

1. An optical device, comprising:

an optical splitter having an input and first and second outputs, said input for coupling to an input optical path, said input optical path carrying a plurality of optical channels, each said optical channels having a respective wavelength, said first output being coupled to a first output optical path, and said second output being coupled to a second output optical path, said first and second output optical paths carrying said plurality of optical channels;

a first plurality of optical filtering elements coupled to said first output optical path, each of said first plurality of optical filtering elements respectively selecting a corresponding one of a plurality of first groups of said plurality of optical channels and associated undesired channels; and a second plurality of optical filtering elements coupled to said second output optical path, each of said second plurality of optical filtering elements respectively selecting a corresponding one of a plurality of second groups of said plurality of optical channels and associated undesired channels, said plurality of first groups of optical channels being different than said plurality of second groups of optical channels;

at least one filter coupled to an associated one of said first and second plurality of optical filtering elements for receiving one of said first and second groups of optical channels and said undesired channels associated with said one of said first and second groups of optical channels, said filter supplying said one of said first and second groups of optical channels as an express channel group while substantially rejecting said undesired channels associated with said one of said first and second groups of optical channels; and a multiplexer receiving said express channel group and at least one added channel group on associated inputs, said added channel group being different from said express channel group, said multiplexer supplying an output comprising said express channel group and said added channel group in an aggregated form on an output optical communication path.

2. An optical device in accordance with claim 1, where said first and second output optical paths are con figured to accommodate additional filtering elements.

3. An optical device in accordance with claim 1, wherein said first and second pluralities of filtering elements comprise interference filters.

4. An optical device in accordance with claim 1, further comprising an optical amplifier coupled to said input of said optical splitter.

5. An optical device in accordance with claim 1, further comprising:

at least one sub-demultiplexer coupled to an optical filtering element, said optical filtering element being one of said first plurality of optical filtering elements, said sub-demultiplexer having a plurality of outputs each presenting a respective drop channel associated with optical filtering element.

6. An optical device in accordance wit claim 1, further comprising:

at least one sub-multiplexer having a plurality of input each configured to receive a respective add channel associated with one of said add channel groups, said sub-multiplexer supplying an output comprising said one of said add channel groups.

7. An optical device in accordance with claim 1, wherein said multiplexer comprises:

a first plurality of optical filtering elements, each of said first plurality of optical filtering elements being coupled to a respective one of a first group of said associated inputs, said first plurality of optical filtering elements supplying channel groups received on said first group of said associated inputs in an aggregated form as a first aggregate channel group on a first aggregate optical path;

a second plurality of optical filtering elements, each of said second plurality of optical filtering elements being coupled to a respective one of a second group of said associated inputs, said second plurality of optical filtering elements supplying channel groups received on said second group of said associated inputs in an aggregated form as a second aggregate channel group on a second aggregate optical path; and an optical coupler having first and second inputs and an output, said first input being coupled to said first aggregate optical path and said second input coupled to said second aggregate optical path, said coupler supplying said first aggregate channel group and said second aggregate channel group in an aggregated form on said single output fiber.

8. An optical device in accordance with claim 7, wherein said first and second
aggregate optical paths are configured to accommodate additional filtering elements.

9. An optical device in accordance with claim 7, wherein said first and second pluralities of filtering elements comprise interference filters.

10. An optical device, comprising:

first and second optical paths carrying a plurality of optical channels;

a first plurality of optical filtering elements coupled to said first optical path, each of said first plurality of optical filtering elements respectively selecting a corresponding one of a plurality of first groups of said plurality of optical channels and associated undesired channels; and a second plurality of optical filtering elements coupled to said second optical path, each of said second plurality of optical filtering elements respectively selecting a corresponding one of a plurality of second groups of said plurality of optical channels and associated undesired channels, said plurality of first groups of optical channels being different than said plurality of second groups of optical channels;

at least one filter coupled to an associated one of said first and second plurality of optical filtering elements for receiving one of said first and second groups of optical channels and said undesired channels associated with said one of said first and second groups of optical channels, said filter supplying said one of said first and second groups of optical channels as an express channel group while substantially rejecting said undesired channels associated with said one of said first and second groups of optical channels; and a multiplexer receiving said express channel group and at least one added channel group on associated inputs, said added channel group being different from said express channel group, said multiplexer supplying an output comprising said express channel group and said added channel group in an aggregated form on a single optical output fiber.

11. An optical device in accordance with claim 10, wherein said first and second optical paths are configured to accommodate additional filtering elements.

12. An optical device in accordance with claim 10, wherein said first and second pluralities of filtering elements comprise interference filters.

13. An optical device in accordance with claim 10, further comprising:

at least one sub-demultiplexer coupled to an associated one of said first and second plurality of optical filtering elements, said sub-demultiplexer having a plurality of outputs each presenting a respective drop channel associated with a corresponding one of said first and second groups of said plurality of channels.

14. An optical device in accordance with claim 10, further comprising:

at least one sub-demultiplexer coupled to an optical filtering element, said optical filtering element being one of said first plurality of optical filtering elements, said sub-demultiplexer having a plurality of outputs each presenting a respective drop channel associated with optical filtering element.

15. An optical device in accordance with claim 10, wherein said multiplexer comprises:
- a first plurality of optical filtering elements, each of said first plurality of optical filtering elements being coupled to a respective one of a first group of said associated inputs, said first plurality of optical filtering elements supplying channel groups received on said first group of said associated inputs in an aggregated form as a first aggregate channel group on a first aggregate optical path;
- a second plurality of optical filtering elements, each of said second plurality of optical filtering elements being coupled to a respective one of a second group of said associated inputs, said second plurality of optical filtering elements supplying channel groups received on said second group of said associated inputs in an aggregated form as a second aggregate channel group on a second aggregate optical path; and
- an optical coupler having first and second inputs and an output, said first input being coupled to said first aggregate optical path and said second input coupled to said second aggregate optical path, said coupler supplying said first aggregate channel group and said second aggregate channel group in an aggregated form on said single output fiber.

16. An optical device in accordance with claim 15, wherein said first and second aggregate optical paths are configured to accommodate additional filtering elements.

17. An optical device in accordance with claim 15, wherein said first and second pluralities of filtering elements comprise interference filters.

18. An optical add/drop multiplexer, comprising:
- an optical splitter having an input and first and second outputs, said input for coupling to an input optical path, said input optical path carrying a plurality of optical channels, each said optical channels having a respective wavelength, said first output being coupled to a first output optical path, and said second output being coupled to a second output optical path, said first and second output optical paths carrying said plurality of optical channels;
- a first plurality of optical filtering elements coupled to said first output optical path, each of said first plurality of optical filtering elements respectively a corresponding one of a plurality of selecting first groups of said plurality of optical channels and associated undesired channels;
- a second plurality of optical filtering elements coupled to said second output optical path, each of said second plurality of optical filtering elements respectively selecting a corresponding one of a plurality of second groups of said plurality of optical channels and associated undesired channels, said plurality of first groups of optical channels being different than said plurality of second groups of optical channels;
- at least one filter coupled to an associated one of said first and second plurality of optical filtering elements for receiving one of said first and second groups of optical channels and said undesired channels associated with said one of said first and second groups of optical channels, said filter supplying said one of said first and second groups of optical channels as an express channel group while reducing said undesired channels associated with said one of said first and second groups of optical channels; and
- a multiplexer receiving said express channel group and at least one added channel group on associated inputs, said added channel group being different from said express channel group, said multiplexer supplying an output comprising said express channel group and said added channel group in an aggregated form on a single optical output fiber.

19. An optical add/drop multiplexer accordance with claim 18, further comprising:
- at least one sub-demultiplexer coupled to an optical filtering element, said optical filtering element being one of said first plurality of optical filtering elements, said sub-demultiplexer having a plurality of outputs each presenting a respective drop channel associated with optical filtering element.

20. An optical device, comprising:
- an optical demultiplexer having an input being configured to receive a plurality of optical signals, each at a respective one of a plurality of wavelengths, and a plurality of outputs, each of which supplying a corresponding one of a plurality of subgroups of said plurality of optical signals, and associated undesired channels;
- a filter coupled to receive one of said plurality of subgroups of said plurality of optical signals, said filter passing said one of said plurality of subgroups of said plurality of optical signals and rejecting undesired channels associated with said one of said plurality of subgroups of said plurality of optical signals; and
- an optical multiplexer coupled to said filter, said multiplexer having a first input being configured to receive an added optical signal subgroup and a second input coupled to receive said one of said plurality of subgroups of said plurality of optical signals, and an output supplying said added optical signal subgroup and said one of said plurality of subgroups of said plurality of optical signals.

21. An optical device in accordance with claim 20, wherein said filter includes a Bragg grating.

22. An optical device in accordance with claim 20, further comprising a variable optical attenuator coupled to said one of said plurality of outputs of said optical demultiplexer.

23. An optical device in accordance with claim 22, further comprising an optical amplifier coupled to optical demultiplexer, said variable optical attenuator being adjusted to provide an attenuation such that each optical signal within said subgroup of said plurality of optical signals has substantially uniform optical power at an output of said optical multiplexer.

24. An optical device in accordance with claim 20, further comprising a dispersion compensating element coupled to one of said plurality of outputs of said optical demultiplexer.

25. An optical device comprising:
- an optical demultiplexer having an input being configured to receive a plurality of optical signals, each at a respective one of a plurality of wavelengths, and a plurality of outputs, each of which supplying a corresponding one of a plurality of subgroups of said plurality of optical signals, and associated undesired channels;
- a plurality of optical switches, each of which being coupled to a respective one of said plurality of outputs of said optical demultiplexer, each of said plurality of optical switches being configured to selectively drop a corresponding one of said subgroups of said plurality of optical signals; and
- a plurality of filters, each of which being coupled to a respective one of said plurality of optical switches, each of said plurality of filters passing a respective one of said plurality of subgroups of said plurality of optical signals and rejecting undesired channels associated with said respective one of said plurality of subgroups of said plurality of optical signals.

26. An optical device in accordance with claim 25, further comprising:

an optical multiplexer having a plurality of inputs, each of which being coupled to a respective one of said plurality of filters, and an output for supplying combined optical signals.

\* \* \* \* \*